US008712890B2

(12) United States Patent
Mathur

(10) Patent No.: US 8,712,890 B2
(45) Date of Patent: Apr. 29, 2014

(54) SYSTEMS AND METHODS FOR OPTIMIZING CAPITAL STRUCTURE OF A FINANCIAL INSTITUTION

(75) Inventor: Sumit Mathur, Pune (IN)

(73) Assignee: SAS Institute Inc., Cary, NC (US)

( * ) Notice: Subject to any disclaimer, the term of this patent is extended or adjusted under 35 U.S.C. 154(b) by 425 days.

(21) Appl. No.: 12/857,777

(22) Filed: Aug. 17, 2010

(65) Prior Publication Data

US 2012/0005118 A1    Jan. 5, 2012

(51) Int. Cl.
*G06Q 40/00* (2012.01)
*G06Q 10/06* (2012.01)

(52) U.S. Cl.
CPC ............ *G06Q 40/00* (2013.01); *G06Q 10/0635* (2013.01)
USPC .......................................... 705/35; 705/36 R

(58) Field of Classification Search
CPC ............................ G06Q 40/00; G06Q 10/0635
USPC .................................................. 705/35, 36 R
See application file for complete search history.

(56) References Cited

U.S. PATENT DOCUMENTS

| | | | |
|---|---|---|---|
| 7,493,278 B2 * | 2/2009 | Jones et al. ................ | 705/36 R |
| 7,778,856 B2 * | 8/2010 | Reynolds et al. ........... | 705/7.28 |
| 2003/0065613 A1 * | 4/2003 | Smith ............................ | 705/38 |
| 2006/0059065 A1 * | 3/2006 | Glinberg et al. ................ | 705/35 |

OTHER PUBLICATIONS

Aziz, Andrew et al., "III.0 Capital Allocation and RAPM", The PRM Handbook, pp. 1-29 (2004).

Berger, Allen N. et al., "Capital Structure and Firm Performance: A New Approach to Testing Agency Theory and an Application to the Banking Industry", pp. 1-37 (Oct. 2002).

Bosch, T. et al., "Optimal Capital Management in Banking", Proceedings of the World Congress on Engineering, 2008, vol. II, WCE 2008, London, U.K., 6 pp. (Jul. 2-4, 2008).

Bunea-Bontas, Cristina et al., "Capital Adequacy and Risk Management—Premises for Strengthening Financial System Stability", Munich Personal RePEc Archive Paper No. 18132, posted 25, 13 pp. (Oct. 25, 2009).

Gersbach, Hans, "The Optimal Capital Structure of an Economy", Alfred-Weber-Institut, University of Heidelberg, Heidelberg, Germamy, pp. 1-30 (Mar. 2002).

(Continued)

*Primary Examiner* — Kirsten Apple
*Assistant Examiner* — Scott S Trotter
(74) *Attorney, Agent, or Firm* — Kilpatrick Townsend & Stockton LLP

(57) ABSTRACT

In accordance with the teachings described herein, systems and methods are provided for optimizing the capital structure of a financial institution. A system may include an optimization engine stored on a computer readable medium and executable by one or more processors, when executed the optimization engine being configured to: receive information identifying available capital of the financial institution for each of a plurality of capital instruments; receive information classifying each of the plurality of capital instruments within one of a plurality of risk levels; receive an overall target capital value for the plurality of capital instruments; and determine an optimum capital value for each of the plurality of capital instruments, the optimal capital values being determined using an optimization algorithm that relates the available capital for the plurality of capital instruments to the overall target capital value subject to a plurality of constraints, the plurality of constraints relating to the capital held by the financial institution at each of the plurality of risk levels.

45 Claims, 21 Drawing Sheets

(56) References Cited

OTHER PUBLICATIONS

Kuritzkes, Andrew et al., "Risk Management, Risk Management and Capital Adequacy in Financial Conglomerates", presented at the Netherlands—United States Roundtable on Financial Conglomerates, Brookings—Wharton Papers on Financial Services, pp. 1-52 (Nov. 25, 2002).

May, J.H. et al., "A Multi-Period Bank Portfolio Management Program", Mathl Modellig, vol. 9, No. 7, pp. 521-531 (Mar. 6, 1987).

Mukuddem-Petersen, J. et al., "An Application of Stochastic Optimization Theory to Institutional Finance", Applied Mathematical Sciences, vol. 1, No. 28, pp. 1359-1385 (2007).

Mukuddem-Petersen, J. et al., "Optimizing Asset and Capital Adequacy Management in Banking", J Optim Theory Appl, vol. 137, pp. 205-230 (2008).

Zerbs, Michael et al., "The role of counterparty credit risk management in surviving financial crisis", Algorithmics, Financial Risk Management Software, http://www.algorithmics.com/EN/, 10 pp., downloaded and printed on Aug. 13, 2010.

Fermat, "Mood's Analytics Software Delivers Award-Winning Integrated Risk and Performance Management Solutions", http://www.fermat.fr, 15 pp., downloaded and printed on Aug. 13, 2010.

Commonwealth Bank of Australia, "Basel II Pillar 3: Capital Adequacy and Risk Disclosures", pp. 1-81 (Jun. 30, 2009).

Oracle Corporation, "Oracle Reveleus Basel II", Oracle Data Sheet, pp. 1-3 (2009).

Oracle Corporation, "Oracle Reveleus Basel II Analytics", Oracle Data Sheet, pp. 1-3 (2010).

Oracle Corporation, "Oracle Financial Services Analytical Applications Reconciliation Framework", Oracle Data Sheet, pp. 1-3 (2010).

Oracle Financial Services, http://www.oracle.com/us/industries/financial-services/index.htm, 8 pp., downloaded and printed on Aug. 13, 2010.

\* cited by examiner

Fig. 7

LONG TERM CAPITAL PLANNING METHOD

ANALYSIS FRAMEWORK | BASE CASE

| BASE CASE INPUTS | 2009 | 2010 | 2011 | 2012 |
|---|---|---|---|---|
| PROJECTED RETAINED EARNINGS | $1,250 | $1,438 | $1,653 | $1,901 |
| PROJECTED UNEXPECTED LOSSES | $1,000 | $1,800 | $1,300 | $1,200 |
| PROJECTED CRAR | 8.0% | 8.0% | 8.0% | 8.0% |

Fig. 8

| CAPITAL INSTRUMENT | AMOUNT | TIER CLASSIFICATION |
|---|---|---|
| EQUITY | 25,000 | TIER 1 |
| RESERVES AND SURPLUS | 10,000 | TIER 1 |
| SUBORDINATED DEBT 56858 | 25,000 | TIER 2 |
| SUBORDINATED DEBT 56857 | 5,000 | TIER 2 |
| SUBORDINATED DEBT 56856 | 3,000 | TIER 2 |
| SUBORDINATED DEBT 56855 | 2,000 | TIER 2 |
| HYBRID CAPITAL | 5,000 | TIER 3 |
| MEZZANINE DEBT 625125 | 5,000 | TIER 3 |
| MEZZANINE DEBT 625124 | 5,000 | TIER 3 |
| TOTAL AVAILABLE CAPITAL | 85,000 | |

GROWTH IN RETAINED EARNINGS     15.0%

150

| | 2009 PROJECTED ($) | 2010 PROJECTED ($) | 2011 PROJECTED ($) | 2012 PROJECTED ($) |
|---|---|---|---|---|
| RETAINED EARNINGS | $1,250 | $1,438 | $1,653 | $1,901 |

160

| CAPITAL INSTRUMENT | AMOUNT | DATE OF REDEMPTION |
|---|---|---|
| SUBORDINATED DEBT 56858 | 25,000 | 30-JUN-14 |
| SUBORDINATED DEBT 56857 | 5,000 | 31-MAR-11 |
| SUBORDINATED DEBT 56856 | 3,000 | 31-DEC-12 |
| SUBORDINATED DEBT 56855 | 2,000 | 31-DEC-15 |
| MEZZANINE DEBT 625125 | 5,000 | 31-M15-17 |
| MEZZANINE DEBT 625124 | 5,000 | 31-MAR-15 |

Fig. 9A

| | 2009 PROJECTED ($) | 2010 PROJECTED ($) | 2011 PROJECTED ($) | 2012 PROJECTED ($) |
|---|---|---|---|---|
| UNEXPECTED LOSS | $1,000 | $1,800 | $1,500 | $1,200 |

← 170

| RISK TYPES RWA | 2009 CURRENT ($) | 2010 PROJECTED ($) | 2011 PROJECTED ($) | 2012 PROJECTED ($) |
|---|---|---|---|---|
| CREDIT RWA | 406,707 | 508,384 | 569,390 | 632,023 |
| MARKET RISK RWA | 345,366 | 448,975 | 502,852 | 558,166 |
| OP RISK RWA | 61,341 | 67,467 | 75,573 | 83,886 |

← 180

| CAR | 8.0% | 81,987 | 91,825 | 101,926 |
|---|---|---|---|---|
| PROJREG CAPITAL | 65,073 | | | |

CONSOLIDATED ADJUSTED CAPITAL

| CAPITAL INSTRUMENT | TIER | AVAILABLE | 2009 | 2010 | 2011 | 2012 |
|---|---|---|---|---|---|---|
| EQUITY | TIER 1 | 25,000 | 25,000 | 25,000 | 25,000 | 25,000 |
| RESERVES AND SURPLUS | TIER 1 | 10,000 | 10,250 | 9,888 | 10,241 | 10,594 |
| SUBORDINATED DEBT 56858 | TIER 2 | 25,000 | 25,000 | 25,000 | 25,000 | 25,000 |
| SUBORDINATED DEBT 56857 | TIER 2 | 5,000 | 5,000 | 5,000 | 0 | 0 |
| SUBORDINATED DEBT 56856 | TIER 2 | 3,000 | 3,000 | 3,000 | 3,000 | 0 |
| SUBORDINATED DEBT 56855 | TIER 2 | 2,000 | 2,000 | 2,000 | 2,000 | 2,000 |
| HYBRID CAPITAL | TIER 3 | 5,000 | 5,000 | 5,000 | 5,000 | 5,000 |
| MEZZANINE DEBT 625125 | TIER 3 | 5,000 | 5,000 | 5,000 | 5,000 | 5,000 |
| MEZZANINE DEBT 625124 | TIER 3 | 5,000 | 5,000 | 5,000 | 5,000 | 5,000 |
| TOTAL AVAILABLE CAPITAL | | 85,000 | 85,250 | 84,888 | 80,241 | 77,594 |

| TIER | AVAILABLE | 2009 | 2010 | 2011 | 2012 |
|---|---|---|---|---|---|
| TIER 1 | 35,000 | 35,250 | 34,887.50 | 35,240.63 | 35,593.75 |
| TIER 2 | 35,000 | 35,000 | 35,000 | 30,000 | 27,000 |
| TIER 3 | 15,000 | 15,000 | 15,000 | 15,000 | 15,000 |

210

| CAPITAL INSTRUMENT | FOR ANALYSIS '2009' | FOR ANALYSIS '2010' | FOR ANALYSIS '2011' | FOR ANALYSIS '2012' | TIER CLASSIFICATION TAG |
|---|---|---|---|---|---|
| EQUITY | 25,000 | | | | TIER 1 |
| RESERVES AND SURPLUS | 10,000 | | | | TIER 1 |
| SUBORDINATED DEBT 56858 | 25,000 | | | | TIER 2 |
| SUBORDINATED DEBT 56857 | 5,000 | | | | TIER 2 |
| SUBORDINATED DEBT 56856 | 3,000 | | | | TIER 2 |
| SUBORDINATED DEBT 56855 | 2,000 | | | | TIER 2 |
| HYBRID CAPITAL | 5,000 | | | | TIER 3 |
| MEZZANINE DEBT 625125 | 5,000 | | | | TIER 3 |
| MEZZANINE DEBT 625124 | 5,000 | | | | TIER 3 |
| TOTAL AVAILABLE CAPITAL | 85,000 | | | | |

212

| | 2009 | 2010 | 2011 | 2012 |
|---|---|---|---|---|
| REGULATORY CAPITAL REQUIRED | 65,073 | | | |
| MARKET RISK TIER 1 CONSTRAINT | 7,874 | | | |

214
216

| TOTALS | 2009 | 2010 | 2011 | 2012 | | CONSTRAINT | 2009 | 2010 | 2011 | 2012 | |
|---|---|---|---|---|---|---|---|---|---|---|---|
| TIER 1 | 35,000 | | | | | TIER 1 | 32,537 | | | | MINIMUM |
| TIER 2 | 35,000 | | | | | TIER 2 | 35,000 | | | | MAXIMUM |
| TIER 3 | 15,000 | | | | | TIER 3 | 19,686 | | | | MAXIMUM |
| TOTAL | 85,000 | | | | | TOTAL | 87,222 | | | | |

| CAPITAL INSTRUMENT | FOR ANALYSIS '2009' | FOR ANALYSIS '2010' | FOR ANALYSIS '2011' | FOR ANALYSIS '2012' | TIER CLASSIFICATION TAG |
|---|---|---|---|---|---|
| EQUITY | 23768.28 | | | | TIER 1 |
| RESERVES AND SURPLUS | 8768.28 | | | | TIER 1 |
| SUBORDINATED DEBT 56858 | 21907.29 | | | | TIER 2 |
| SUBORDINATED DEBT 56857 | 1907.288 | | | | TIER 2 |
| SUBORDINATED DEBT 56856 | 0 | | | | TIER 2 |
| SUBORDINATED DEBT 56855 | 0 | | | | TIER 2 |
| HYBRID CAPITAL | 2907.288 | | | | TIER 3 |
| MEZZANINE DEBT 625125 | 2907.288 | | | | TIER 3 |
| MEZZANINE DEBT 625124 | 2907.288 | | | | TIER 3 |
| TOTAL AVAILABLE CAPITAL | 65,073 | | | | |

222

| | 2009 | 2010 | 2011 | 2012 |
|---|---|---|---|---|
| REGULATORY CAPITAL REQUIRED | 65,073 | | | |
| MARKET RISK TIER 1 CONSTRAINT | 7,874 | | | |

224

| TOTALS | 2009 | 2010 | 2011 | 2012 | | CONSTRAINT | 2009 | 2010 | 2011 | 2012 | |
|---|---|---|---|---|---|---|---|---|---|---|---|
| TIER 1 | 32,537 | | | | | TIER 1 | 32,537 | | | | MINIMUM |
| TIER 2 | 25,815 | | | | | TIER 2 | 32,537 | | | | MAXIMUM |
| TIER 3 | 8,722 | | | | | TIER 3 | 19,686 | | | | MAXIMUM |
| TOTAL | 65,073 | | | | | TOTAL | 84,759 | | | | |

| CAPITAL INSTRUMENT | FOR ANALYSIS '2009' | FOR ANALYSIS '2010' | FOR ANALYSIS '2011' | FOR ANALYSIS '2012' | TIER CLASSIFICATION TAG |
|---|---|---|---|---|---|
| EQUITY | | 25,000 | | | TIER 1 |
| RESERVES AND SURPLUS | | 9,888 | | | TIER 1 |
| SUBORDINATED DEBT 56858 | | 25,000 | | | TIER 2 |
| SUBORDINATED DEBT 56857 | | 5,000 | | | TIER 2 |
| SUBORDINATED DEBT 56856 | | 3,000 | | | TIER 2 |
| SUBORDINATED DEBT 56855 | | 2,000 | | | TIER 2 |
| HYBRID CAPITAL | | 5,000 | | | TIER 3 |
| MEZZANINE DEBT 625125 | | 5,000 | | | TIER 3 |
| MEZZANINE DEBT 625124 | | 5,000 | | | TIER 3 |
| TOTAL AVAILABLE CAPITAL | | 85,000 | | | |

| | 2009 | 2010 | 2011 | 2012 |
|---|---|---|---|---|
| REGULATORY CAPITAL REQUIRED | | 81,987 | | |
| MARKET RISK TIER 1 CONSTRAINT | | 10,257 | | |

| TOTALS | 2009 | 2010 | 2011 | 2012 | CONSTRAINT | 2009 | 2010 | 2011 | 2012 | |
|---|---|---|---|---|---|---|---|---|---|---|
| TIER 1 | | 34,888 | | | TIER 1 | | 40,993 | | | MINIMUM |
| TIER 2 | | 35,000 | | | TIER 2 | | 40,993 | | | MAXIMUM |
| TIER 3 | | 15,000 | | | TIER 3 | | 25,593 | | | MAXIMUM |
| TOTAL | | 84,888 | | | TOTAL | | 107,578 | | | |

| CAPITAL INSTRUMENT | FOR ANALYSIS '2009' | FOR ANALYSIS '2010' | FOR ANALYSIS '2011' | FOR ANALYSIS '2012' | TIER CLASSIFICATION TAG |
|---|---|---|---|---|---|
| EQUITY | | 33,879 | | | TIER 1 |
| RESERVES AND SURPLUS | | 9,888 | | | TIER 1 |
| SUBORDINATED DEBT 56858 | | 23,317 | | | TIER 2 |
| SUBORDINATED DEBT 56857 | | 3,317 | | | TIER 2 |
| SUBORDINATED DEBT 56856 | | 1,317 | | | TIER 2 |
| SUBORDINATED DEBT 56855 | | 317 | | | TIER 2 |
| HYBRID CAPITAL | | 3,317 | | | TIER 3 |
| MEZZANINE DEBT 625125 | | 3,317 | | | TIER 3 |
| MEZZANINE DEBT 625124 | | 3,317 | | | TIER 3 |
| TOTAL AVAILABLE CAPITAL | | 81,897 | | | |

| | 2009 | 2010 | 2011 | 2012 |
|---|---|---|---|---|
| REGULATORY CAPITAL REQUIRED | | 81,987 | | |
| MARKET RISK TIER 1 CONSTRAINT | | 10,237 | | |

| TOTALS | 2009 | 2010 | 2011 | 2012 |
|---|---|---|---|---|
| TIER 1 | | 43,767 | | |
| TIER 2 | | 28,268 | | |
| TIER 3 | | 9,951 | | |
| TOTAL | | 81,987 | | |

| CONSTRAINT | 2009 | 2010 | 2011 | 2012 | |
|---|---|---|---|---|---|
| TIER 1 | | 40,996 | | | MINIMUM |
| TIER 2 | | 40,993 | | | MAXIMUM |
| TIER 3 | | 25,592 | | | MAXIMUM |
| TOTAL | | 107,581 | | | |

Fig. 15

| CAPITAL INSTRUMENT | FOR ANALYSIS '2009' | FOR ANALYSIS '2010' | FOR ANALYSIS '2011' | FOR ANALYSIS '2012' | TIER CLASSIFICATION TAG |
|---|---|---|---|---|---|
| EQUITY | | | 25,000 | | TIER 1 |
| RESERVES AND SURPLUS | | | 10,241 | | TIER 1 |
| SUBORDINATED DEBT 56858 | | | 25,000 | | TIER 2 |
| SUBORDINATED DEBT 56857 | | | 0 | | TIER 2 |
| SUBORDINATED DEBT 56856 | | | 3,000 | | TIER 2 |
| SUBORDINATED DEBT 56855 | | | 2,000 | | TIER 2 |
| HYBRID CAPITAL | | | 5,000 | | TIER 3 |
| MEZZANINE DEBT 625125 | | | 5,000 | | TIER 3 |
| MEZZANINE DEBT 625124 | | | 5,000 | | TIER 3 |
| TOTAL AVAILABLE CAPITAL | | | 80,241 | | |

| | 2009 | 2010 | 2011 | 2012 |
|---|---|---|---|---|
| REGULATORY CAPITAL REQUIRED | | | 91,825 | |
| MARKET RISK TIER 1 CONSTRAINT | | | 11,465 | |

| CONSTRAINT | 2009 | 2010 | 2011 | 2012 | |
|---|---|---|---|---|---|
| TIER 1 | | | 45,913 | | MINIMUM |
| TIER 2 | | | 45,913 | | MAXIMUM |
| TIER 3 | | | 28,663 | | MAXIMUM |
| TOTAL | | | 120,488 | | |

| TOTALS | 2009 | 2010 | 2011 | 2012 |
|---|---|---|---|---|
| TIER 1 | | | 35,241 | |
| TIER 2 | | | 30,000 | |
| TIER 3 | | | 15,000 | |
| TOTAL | | | 80,241 | |

| CAPITAL INSTRUMENT | FOR ANALYSIS '2009' | FOR ANALYSIS '2010' | FOR ANALYSIS '2011' | FOR ANALYSIS '2012' | TIER CLASSIFICATION TAG |
|---|---|---|---|---|---|
| EQUITY | | | 34,478 | | TIER 1 |
| RESERVES AND SURPLUS | | | 12,347 | | TIER 1 |
| SUBORDINATED DEBT 56858 | | | 25,000 | | TIER 2 |
| SUBORDINATED DEBT 56857 | | | 0 | | TIER 2 |
| SUBORDINATED DEBT 56856 | | | 3,000 | | TIER 2 |
| SUBORDINATED DEBT 56855 | | | 2,000 | | TIER 2 |
| HYBRID CAPITAL | | | 5,000 | | TIER 3 |
| MEZZANINE DEBT 625125 | | | 5,000 | | TIER 3 |
| MEZZANINE DEBT 625124 | | | 5,000 | | TIER 3 |
| TOTAL AVAILABLE CAPITAL | | | 91,825 | | |

| | 2009 | 2010 | 2011 | 2012 |
|---|---|---|---|---|
| REGULATORY CAPITAL REQUIRED | | | 91,825 | |
| MARKET RISK TIER 1 CONSTRAINT | | | 11,465 | |

| CONSTRAINT | 2009 | 2010 | 2011 | 2012 | |
|---|---|---|---|---|---|
| TIER 1 | | | 45,913 | | MINIMUM |
| TIER 2 | | | 45,913 | | MAXIMUM |
| TIER 3 | | | 28,663 | | MAXIMUM |
| TOTAL | | | 120,488 | | |

| TOTALS | 2009 | 2010 | 2011 | 2012 |
|---|---|---|---|---|
| TIER 1 | | | 46,825 | |
| TIER 2 | | | 30,000 | |
| TIER 3 | | | 15,000 | |
| TOTAL | | | 91,825 | |

Fig. 16

| CAPITAL INSTRUMENT | FOR ANALYSIS '2009' | FOR ANALYSIS '2010' | FOR ANALYSIS '2011' | FOR ANALYSIS '2012' | TIER CLASSIFICATION TAG |
|---|---|---|---|---|---|
| EQUITY | | | | 25,000 | TIER 1 |
| RESERVES AND SURPLUS | | | | 10,594 | TIER 1 |
| SUBORDINATED DEBT 56858 | | | | 25,000 | TIER 2 |
| SUBORDINATED DEBT 56857 | | | | 0 | TIER 2 |
| SUBORDINATED DEBT 56856 | | | | 0 | TIER 2 |
| SUBORDINATED DEBT 56855 | | | | 2,000 | TIER 2 |
| HYBRID CAPITAL | | | | 5,000 | TIER 3 |
| MEZZANINE DEBT 625125 | | | | 5,000 | TIER 3 |
| MEZZANINE DEBT 625124 | | | | 5,000 | TIER 3 |
| TOTAL AVAILABLE CAPITAL | | | | 77,594 | |

| | 2009 | 2010 | 2011 | 2012 |
|---|---|---|---|---|
| REGULATORY CAPITAL REQUIRED | | | | 65,073 |
| MARKET RISK TIER 1 CONSTRAINT | | | | 32,557 |

| CONSTRAINT | 2009 | 2010 | 2011 | 2012 | |
|---|---|---|---|---|---|
| TIER 1 | | | | 50,963 | MINIMUM |
| TIER 2 | | | | 50,963 | MAXIMUM |
| TIER 3 | | | | 31,815 | MAXIMUM |
| TOTAL | | | | 133,741 | |

| TOTALS | 2009 | 2010 | 2011 | 2012 |
|---|---|---|---|---|
| TIER 1 | | | | 35,594 |
| TIER 2 | | | | 27,000 |
| TIER 3 | | | | 15,000 |
| TOTAL | | | | 77,594 |

Fig. 17

| CAPITAL INSTRUMENT | FOR ANALYSIS '2009' | FOR ANALYSIS '2010' | FOR ANALYSIS '2011' | FOR ANALYSIS '2012' | TIER CLASSIFICATION TAG |
|---|---|---|---|---|---|
| EQUITY | | | | 41,811 | TIER 1 |
| RESERVES AND SURPLUS | | | | 15,018 | TIER 1 |
| SUBORDINATED DEBT 56858 | | | | 25,442 | TIER 2 |
| SUBORDINATED DEBT 56857 | | | | 442.4028 | TIER 2 |
| SUBORDINATED DEBT 56856 | | | | 442 | TIER 2 |
| SUBORDINATED DEBT 56855 | | | | 2,442 | TIER 2 |
| HYBRID CAPITAL | | | | 5,442 | TIER 3 |
| MEZZANINE DEBT 625125 | | | | 5,442 | TIER 3 |
| MEZZANINE DEBT 625124 | | | | 5,442 | TIER 3 |
| TOTAL AVAILABLE CAPITAL | | | | 101,926 | |

| | 2009 | 2010 | 2011 | 2012 |
|---|---|---|---|---|
| REGULATORY CAPITAL REQUIRED | | | | 101,926 |
| MARKET RISK TIER 1 CONSTRAINT | | | | 12,726 |

| CONSTRAINT | 2009 | 2010 | 2011 | 2012 |
|---|---|---|---|---|
| TIER 1 | | | | 56,829 |
| TIER 2 | | | | 28,770 |
| TIER 3 | | | | 16,327 |
| TOTAL | | | | 101,926 |

| TOTALS | 2009 | 2010 | 2011 | 2012 | |
|---|---|---|---|---|---|
| TIER 1 | | | | 50,963 | MINIMUM |
| TIER 2 | | | | 50,963 | MAXIMUM |
| TIER 3 | | | | 31,815 | MAXIMUM |
| TOTAL | | | | 133,741 | |

| CAPITAL INSTRUMENT | FOR ANALYSIS '2009' | FOR ANALYSIS '2010' | FOR ANALYSIS '2011' | FOR ANALYSIS '2012' | TIER CLASSIFICATION TAG |
|---|---|---|---|---|---|
| EQUITY | 23,768 | 33,879 | 34,478 | 41,811 | TIER 1 |
| RESERVES AND SURPLUS | 8,768 | 9,888 | 12,347 | 15,018 | TIER 1 |
| SUBORDINATED DEBT 56858 | 21,907 | 23,317 | 25,000 | 25,442 | TIER 2 |
| SUBORDINATED DEBT 56857 | 1,907 | 3,317 | 0 | 442 | TIER 2 |
| SUBORDINATED DEBT 56856 | 0 | 1,317 | 3,000 | 442 | TIER 2 |
| SUBORDINATED DEBT 56855 | 0 | 317 | 2,000 | 2,442 | TIER 3 |
| HYBRID CAPITAL | 2,907 | 3,317 | 5,000 | 5,442 | TIER 3 |
| MEZZANINE DEBT 625125 | 2,907 | 3,317 | 5,000 | 5,442 | TIER 3 |
| MEZZANINE DEBT 625124 | 2,907 | 3,317 | 5,000 | 5,442 | TIER 3 |
| TOTAL AVAILABLE CAPITAL | 65,073 | 81,897 | 91,825 | 101,926 | |

| | 2009 | 2010 | 2011 | 2012 |
|---|---|---|---|---|
| REGULATORY CAPITAL REQUIRED | 65,073 | 81,987 | 91,825 | 101,926 |
| MARKET RISK TIER 1 CONSTRAINT | 7,874 | 10,237 | 11,465 | 12,726 |

| TOTALS | 2009 | 2010 | 2011 | 2012 | | CONSTRAINT | 2009 | 2010 | 2011 | 2012 | |
|---|---|---|---|---|---|---|---|---|---|---|---|
| TIER 1 | 32,537 | 43,767 | 46,825 | 56,829 | | TIER 1 | 32,537 | 40,996 | 45,913 | 50,963 | MINIMUM |
| TIER 2 | 25,815 | 28,268 | 30,000 | 28,770 | | TIER 2 | 32,537 | 40,993 | 45,913 | 50,963 | MAXIMUM |
| TIER 3 | 8,722 | 9,951 | 15,000 | 16,327 | | TIER 3 | 19,686 | 25,592 | 28,663 | 31,815 | MAXIMUM |
| TOTAL | 65,073 | 81,987 | 91,825 | 101,926 | | TOTAL | 84,759 | 107,578 | 120,488 | 133,741 | |

| CAPITAL INSTRUMENT | TIER CLASS | OPTIMIZED CAPITAL FOR 2009 | ADJUSTED CAPITAL FOR 2009 | SHORTFALL/ SURPLUS 2009 | | OPTIMIZED CAPITAL FOR 2010 | ADJUSTED CAPITAL FOR 2010 | SHORTFALL/ SURPLUS 2010 |
|---|---|---|---|---|---|---|---|---|
| EQUITY | TIER 1 | 23,768 | 25,000 | 1,232 | | 33,879 | 25,000 | -8,879 |
| RESERVES AND SURPLUS | TIER 1 | 8,768 | 10,250 | 1,482 | | 9,888 | 9,888 | -1 |
| SUBORDINATED DEBT 56858 | TIER 2 | 21,907 | 25,000 | 3,093 | | 23,317 | 25,000 | 1,683 |
| SUBORDINATED DEBT 56857 | TIER 2 | 1,907 | 5,000 | 3,093 | | 3,317 | 5,000 | 1,683 |
| SUBORDINATED DEBT 56856 | TIER 2 | 0 | 3,000 | 3,000 | | 1,317 | 3,000 | 1,683 |
| SUBORDINATED DEBT 56855 | TIER 2 | 0 | 2,000 | 2,000 | | 317 | 2,000 | 1,683 |
| HYBRID CAPITAL | TIER 3 | 2,907 | 5,000 | 2,093 | | 3,317 | 5,000 | 1,683 |
| MEZZANINE DEBT 625125 | TIER 3 | 2,907 | 5,000 | 2,093 | | 3,317 | 5,000 | 1,683 |
| MEZZANINE DEBT 625124 | TIER 3 | 2,907 | 5,000 | 2,093 | | 3,317 | 5,000 | 1,683 |
| TOTAL AVAILABLE CAPITAL | | 65,073 | 85,250 | 20,177 | | 81,897 | 84,888 | 2,900 |

| | | | | | | | |
|---|---|---|---|---|---|---|---|
| TIER 1 | 32,537 | 35,250 | 2,713 | | 43,762 | 34,888 | -8,880 |
| TIER 2 | 23,815 | 35,000 | 11,185 | | 28,268 | 35,000 | 6,732 |
| TIER 3 | 8,732 | 15,000 | 6,278 | | 9,951 | 15,000 | 5,049 |

| WORSE GAP | AMOUNT | YEAR |
|---|---|---|
| TIER 1 | -22,236 | 2012 |
| TIER 2 | -2,770 | 2012 |
| TIER 3 | -1,327 | 2012 |

*Fig. 20A*

| OPTIMIZED CAPITAL FOR 2011 | ADJUSTED CAPITAL FOR 2011 | SHORTFALL/ SURPLUS 2011 |
|---|---|---|
| 34,478 | 25,000 | -9,478 |
| 12,347 | 10,241 | -2,107 |
| 25,000 | 25,000 | 0 |
| 0 | 0 | 0 |
| 3,000 | 3,000 | 0 |
| 2,000 | 2,000 | 0 |
| 5,000 | 5,000 | 0 |
| 5,000 | 5,000 | 0 |
| 5,000 | 5,000 | 0 |
| 91,825 | 80,241 | -11,984 |

| 46,815 | 35,241 | -11,584 |
|---|---|---|
| 30,000 | 10,000 | 0 |
| 15,000 | 15,000 | 0 |

| OPTIMIZED CAPITAL FOR 2012 | ADJUSTED CAPITAL FOR 2012 | SHORTFALL/ SURPLUS 2012 |
|---|---|---|
| 41,811 | 25,000 | -16,811 |
| 15,018 | 10,594 | -4,424 |
| 25,442 | 25,000 | -442 |
| 442 | 0 | -442 |
| 442 | 0 | -442 |
| 2,442 | 2,000 | -442 |
| 5,442 | 5,000 | -442 |
| 5,442 | 5,000 | -442 |
| 5,442 | 5,000 | -442 |
| 101,926 | 77,594 | -24,332 |

| 56,829 | 35,594 | -21,236 |
|---|---|---|
| 28,770 | 27,000 | -1,770 |
| 16,327 | 15,000 | -1,327 |

Fig. 20B

SYSTEMS AND METHODS FOR OPTIMIZING CAPITAL STRUCTURE OF A FINANCIAL INSTITUTION

CROSS-REFERENCE TO RELATED APPLICATIONS

This application claims priority to pending Indian Patent Application No. 1534/DEL/2010 filed on Jun. 30, 2010 and entitled "Systems and Methods for Optimizing the Capital Structure of a Financial Institution." The entirety of which is herein incorporated by reference.

FIELD

The technology described in this patent document relates generally to the fields of computer-implemented optimization and capital planning.

BACKGROUND

The capital structure of a bank plays an important role in preventing losses above an expected loss level. Capital is typically available to banks in different forms, such as equity, reserves and surplus, subordinate bonds, mezzanine capital, hybrid capital, etc. Regulations set by the Central Bank in any jurisdiction typically set norms for eligibility of different capital instruments and the adequacy of this capital in proportion to the risk associated with a bank's assets and operations. For instance, the Basel Accord issued by the Basel Committee on Banking Supervision provides recommendations for regulating the capital structure of a financial institution. Specifically, the Basel II accord provides a capital classification system that categories capital as Tier 1, Tier 2 or Tier 3 capital based on the risk absorbing capacity of the capital instruments, with Tier 1 capital bearing the highest risk absorbing capacity followed by Tier 2 and then Tier 3. The Basel II accord also provides a capital to risk adequacy ratio CRAR (i.e., the ratio of eligible capital to risk weighted assets) and constraints on the maximum and/or minimum level of capital within each Tier, i.e., Tier 1, Tier 2 and Tier 3 capital and the interrelationship between each Tier.

In order to hold an optimal amount of capital and eventually optimize the associated risk return trade off, a financial institution may develop a long-term capital plan spanning a multiple year horizon. Within a financial institution, the capital planning process may require input from different divisions, such as the Risk Management division, Finance division and Treasury division. The Risk Management division of a bank is responsible for estimating the economic capital (ECAP) over multiple time steps. This process is usually an outcome of combining Economic Capital of individual risk types by using aggregation techniques to arrive at a balance sheet economic capital figure. One of the main purpose of ECAP is to ensure that the level of capital within a bank is sufficient to achieve a desired debt rating in order to withstand the risk of unexpected losses, occurring at a desired confidence level. The Risk Management division may also perform stress testing of the ECAP estimate so that the bank is aware of the level of capital that it might require in the worst case scenario. The Finance Division of a bank is typically responsible for maintaining the capital of the bank at the prescribed regulatory level so that a bank can do business as usual. The Finance Division ensures that the bank achieves the minimum stipulated CRAR The Treasury Division is typically responsible for managing the physical stock of capital based on different management recommendations (for example asset classes for investment of capital), and for this purpose accessing the financial/capital markets to issue capital, invest surplus capital, and managing capital redemption/amortization that may happen from time to time. Since holistic capital planning is an outcome of a collaborative effort of different divisions in a financial institution, it would be useful to have a mechanism that could pool the resources of the different divisions of a financial institution in a single integrated framework to develop an optimal long-term capital plan.

SUMMARY

In accordance with the teachings described herein, systems and methods are provided for optimizing the capital structure of a financial institution. A system may include an optimization engine stored on a computer readable medium and executable by one or more processors, when executed the optimization engine being configured to: receive information identifying available capital of the financial institution for each of a plurality of capital instruments; receive information classifying each of the plurality of capital instruments within one of a plurality of risk levels; receive an overall target capital value for the plurality of capital instruments; and determine an optimum capital value for each of the plurality of capital instruments, the optimal capital values being determined using an optimization algorithm that relates the available capital for the plurality of capital instruments to the overall target capital value subject to a plurality of constraints, the plurality of constraints relating to the capital held by the financial institution at each of the plurality of risk levels.

Embodiments of the system may include a capital adjustment module stored on the computer readable medium and executable by the one or more processors, when executed the capital adjustment module being configured to: determine one or more adjustments to the available capital for each of the plurality of investment vehicles based on one or more of projected accretion to retained earnings, capital amortization and projected losses; wherein the optimization engine relates the adjusted available capital for the plurality of capital instruments to the overall target capital value subject to the plurality of constraints to determine the optimum capital value for each of the plurality of capital instruments. The system may also include a capital analysis module stored on the computer readable medium and executable by the one or more processors, when executed the capital analysis module being configured to: generate a report that compares the adjusted available capital for each of the plurality of investment vehicles with the optimum capital value for each of the plurality of investment vehicles.

A computer-implemented method of optimizing the capital structure of a financial institution may include the steps of: receiving information identifying available capital of the financial institution for each of a plurality of capital instruments; receiving information classifying each of the plurality of capital instruments within one of a plurality of risk levels; receiving an overall target capital value for the plurality of capital instruments; and determining an optimum capital value for each of the plurality of capital instruments, the optimal capital values being determined using an optimization algorithm that relates the available capital for the plurality of capital instruments to the overall target capital value subject to a plurality of constraints, the plurality of constraints relating to the capital held by the financial institution at each of the plurality of risk levels. Embodiments of the method may also include receiving one or more adjustments to the available capital for each of the plurality of investment vehicles based on one or more of projected accretion to retained earnings, capital amortization and projected losses, wherein the optimization algorithm relates the adjusted available capital for the plurality of capital instruments to the overall target capital value subject to the plurality of constraints. The method may also include generating a report that compares the adjusted available capital for each of the plurality of investment vehicles with the optimum capital value for each of the plurality of investment vehicles.

BRIEF DESCRIPTION OF THE DRAWINGS

FIGS. 7-20 illustrate an example of capital structure optimization.

DETAILED DESCRIPTION

Figure 1:
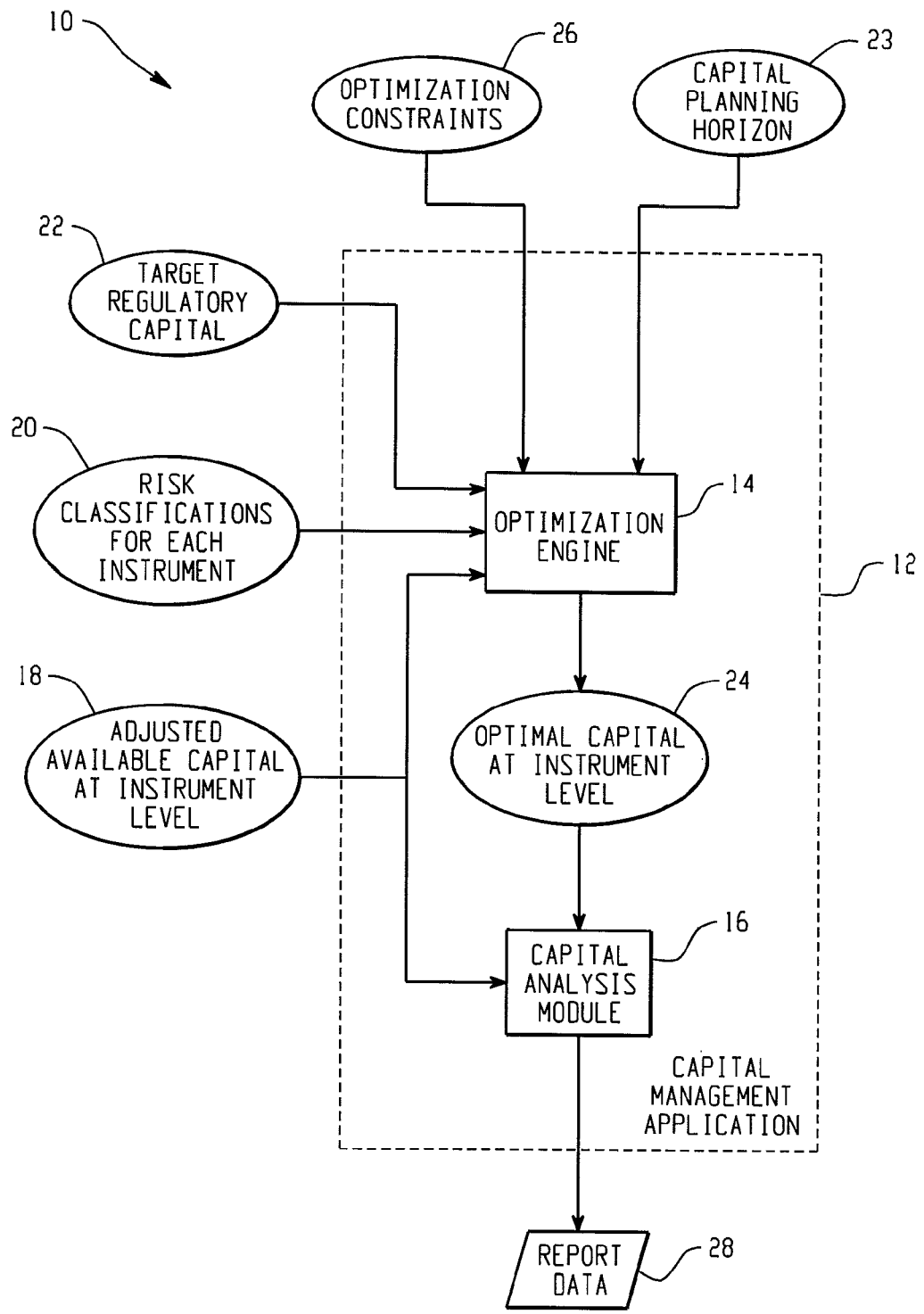
FIG. 1 is a block diagram of an example system for optimizing capital structure.

FIG. 1 is a block diagram of an example system 10 for optimizing capital structure. The system 10 includes a capital management application 12, which may be provided by software instructions stored in a memory device(s) and executed by one or more processors, for example as described below with reference to FIG. 20. The example capital management application 12 includes an optimization engine 14 and a capital analysis module 16. The capital management application 12 receives information 18 identifying the financial institution's available capital for each of a plurality of capital instruments, which may be adjusted to account for one or more factors such as accretion to retained earnings, amortization, and unexpected losses. The adjusted available capital 18 may, for example, be based on input from multiple divisions of a financial institution, as described below with reference to FIG. 3A.

In conjunction with the adjusted available capital 18, the optimization engine 14 also receives information 20 to classify each of the capital instruments into one of a plurality of risk levels. For instance, in connection with each of the identified capital instruments 18, classification information 20 may be received to indicate whether the instrument is classified as Tier 1, Tier 2 or Tier 3 capital, as defined by the second Basel Accord (Basel II) published by the Basel Committee on Banking Supervision.

In addition, the optimization engine 14 also receives a target capital value 22, which may represent a target value for the summation of the capital for each of the plurality of capital instruments. The target capital value 22 may, for example, be based on input from the financial institution's risk division to set the target capital 22 in compliance with the required regulatory capital, as described below with reference to FIG. 3B.

The optimization engine 14 may also receive an input 23 to identify the capital planning horizon, i.e., the duration of the capital planning analysis. The capital planning horizon 23 may, for instance, identify a plurality of years to include in the capital plan.

In one example, the adjusted available capital 18, risk classifications 20, target capital 22 and/or capital planning horizon 23 may be input to the capital management application 12 using an application interface that is accessible over a computer network, such as an intranet maintained by the financial institution. For example, a network-based graphical user interface may be provided to enable different divisions of a financial institution to provide input to the capital management application 12.

In operation, the optimization engine 14 determines an optimal capital value 24 for each of the plurality of capital instruments. The optimal capital values 24 may be determined using an optimization algorithm that relates the available capital 18 for each of the capital instruments to the overall target capital value 22 subject to a plurality of optimization constraints 26, where the optimization constraints relate to the capital held by the financial institution at each of the plurality of risk levels. For example, the optimization constraints 26 may include regulatory constraints on Tier 1, Tier 2 and Tier 3 capital. For instance, the optimization constraints 26 may require that Tier 1 capital be a minimum of 50% of the financial institution's total capital, that Tier 2 capital be less than Tier 1 capital, and that Tier 3 capital be less than 250% of an amount of Tier 1 required to support market risk. In addition, other constraints 26 may also be provided, such as a constraint preventing negative capital values. In one example, the optimization constraints 26 may be set, for example by the risk division of the financial institution, and stored in a database for retrieval by the optimization engine 14.

Following is an example of a multi-stage optimization algorithm that may be utilized by the optimization engine 14 to determine the optimal capital 24 for each instrument.

For t=1 to n, $$\sum_a T^P_{1,t+1} + \sum_b T^P_{2,t+1} + \sum_c T^P_{3,t+1} = RWA^P_{t+1} \times CRAR^P_{t+1} = K^P_{t+1};$$

subject to the following constraints:

$T_{1,t} \geq 50\% \times RWA^P_t$ $T_{2,t} \leq 100\% \times T_{1,t}$ $T_{3,t} \leq 250\% \times 28.5\% \times \{8\% \times RWA_{MarketRisk}\}$ $T_{1,t} \geq 0$ $T_{2,t} \geq 0$ $T_{3,t} \geq 0$ where,
Capital Planning horizon=1 to n;
Tier 1 Capital=$T_1$, summed over range of Tier 1 instruments denoted by 'a';
Tier 2 Capital=$T_2$, summed over range of Tier 2 instruments denoted by 'b';

Tier 3 Capital=$T_3$, summed over range of Tier 3 instruments denoted by 'c';
Overall Capital=K;
Current period=$t_0$;
Risk Weighted Assets=RWA (Asset Value Multiplied by the Risk Weight);
Market Risk=MR;
Projected=P; and
Regulatory capital (%)=CRAR (based on regulatory minimum, e.g., 8% specified by the extant Basel II regulations)[Capital to Risk Adequacy Ratio]

With reference again to FIG. 1, the capital analysis module 16 may be used to generate one or more reports 28 based on the optimal capital 24. For instance, the capital analysis module 16 may generate one or more reports 28 that compare the adjusted available capital 18 with the optimal capital 24 for each instrument. The report data 28 may also include other information useful for capital planning, such as the overall target capital 22, the total optimal capital at each risk level (e.g., Tier 1, Tier 2, Tier 3), and/or other information.

In certain embodiments, the optimal capital for each instrument 24 may be determined for each year of a multi-year planning period. In such an example, the optimization engine 14 may also receive an input defining the length of the planning period, and the adjusted available capital 18 and target capital 22 values may be received for each year. One or more capital planning reports 28 may then be generated to compare the available capital 18 with the optimal capital 24 for the duration of the planning period.

Figure 2:
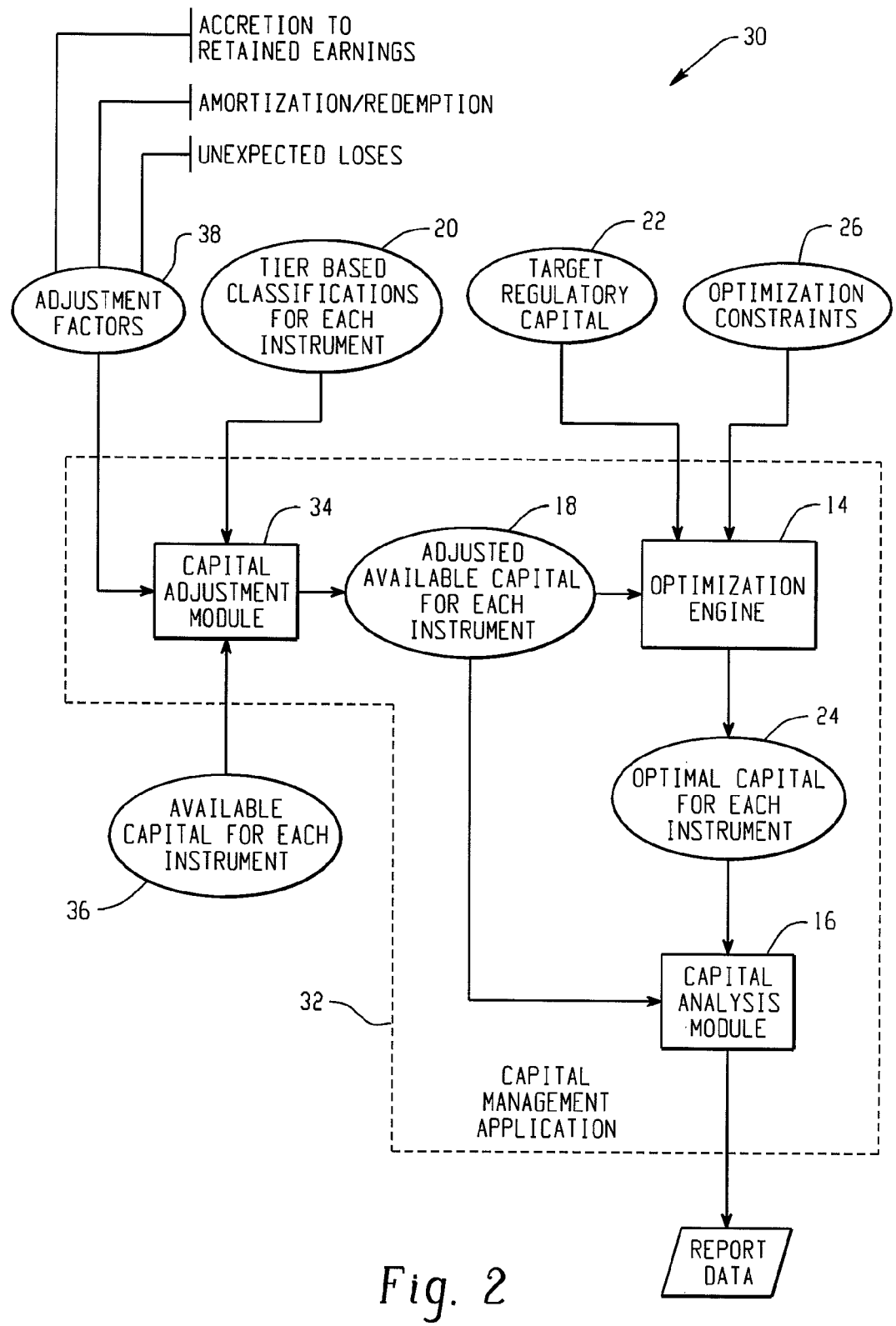
FIG. 2 is a block diagram of another example system for optimizing capital structure.

FIG. 2 is a block diagram of another example system 30 for optimizing capital structure. In this example, the capital management application 32 includes a capital adjustment module 34 in addition to the optimization engine 14 and capital analysis module 16. The capital adjustment module 34, like the optimization engine 14 and capital analysis module 16, may be provided by software instructions stored in a memory device(s) and executed by one or more processors, for example as described below with reference to FIG. 20. In operation, the capital adjustment module 34 receives the available capital for each capital instrument 36 along with the risk classifications for each instrument 20, and applies one or more adjustment factors 38 to determine the adjusted available capital for each instrument 18. The adjustment factors 38 may, for example, include the projected accretion to retained earnings, the capital amortization schedule, and the projected unexpected losses (e.g., projected losses above provisions).

In one example, the adjustment factors 38 may be input to the capital management application 32 using an application interface that is accessible over a computer network, such as an intranet maintained by the financial institution. For example, a network-based graphical user interface may be provided to enable different divisions of a financial institution to provide input to the capital management application 32. For instance, the bank's finance division may provide the available capital for each instrument 36, the risk classifications 20 and the projected accretion to retained earnings, the bank's treasury division may provide the amortization schedule, and the bank's risk division may provide the risk weighted assets required by all risk types, e.g., Credit, Market and Operational, the overall target capital value 22 (calculated based on CRAR) and one or more of the optimization constraints 26.

Following is an example set of algorithms that may be utilized by the capital adjustment module to determine the adjust the currently available capital at an instrument level 18.

$$K_0 = T_{1,0} + T_{2,0} + T_{3,0} = \sum_{a,b,c} T_0,$$

where,
$K_0$=current total available capital;
$T_{1,0}$=current Tier 1 capital;
$T_{2,0}$=current Tier 2 capital
$T_{3,0}$=Tier 3 capital at the beginning of the planning period ($T_0$); and
a, b, and c are the instruments in Tier 1, Tier 2 and Tier 3 capital respectively;

$$T_{1,t}^P = T_{1,t-1} + RE_t^P - xUL_t^P = \sum_a T_{1,t}^P,$$

where,
a=Instruments eligible for Tier 1 inclusion;
$T_{1,t}^P$=projected Tier 1 capital at the end of period t;
$T_{1,0}$=Tier 1 Capital at the beginning of the planning period 0;
$RE_1$=Retained Earnings at the end of period 1 that are ploughed back into Tier 1; and
$xUL_1$=Unexpected Losses (in proportion x) deducted from Tier 1;

$$T_{2,t}^P = T_{2,t-1} - (1-x)UL_t^P - Y_{2,t} = \sum_b T_{2,t}^P,$$

where,
b=Instruments eligible for Tier 2 inclusion;
$T_{2,t}^P$=Projected Tier 2 capital at the beginning of period t+1;
$T_{2,0}$=Tier 2 Capital at the beginning of the planning period;
$(1-x)UL_1$=Unexpected Losses (in proportion 1-x) deducted from Tier 2; and
$Y_{2,t+1}$=Redemption in Tier 2 in Period t+1;

$$T_{3,t+1}^P = T_{3,t-1}^P - Y_{3,t+1} = \sum_c T_{3,t}^P,$$

where,
c=Instruments eligible for Tier 3 inclusion
$T_{3,t+1}^P$=Projected Tier 3 capital at the beginning of period t+1;
$T_{3,0}$=Tier 3 Capital at the end of Period 1; and
$Y_{3,t+1}$=Redemption in Tier 3 in Period t+1.

Figure 3A:
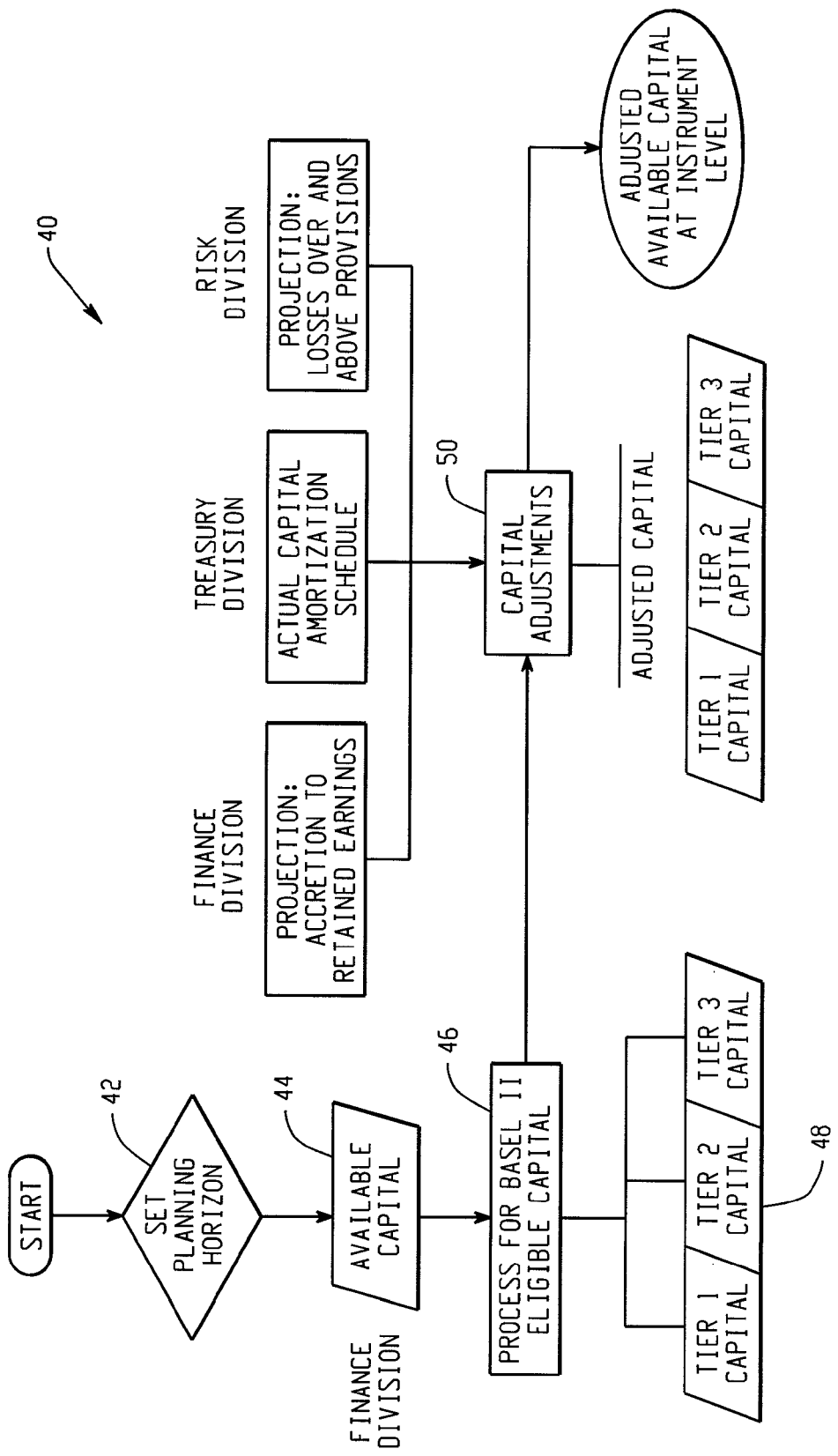
FIG. 3A is a diagram of an example method for adjusting and categorizing the available capital of a financial institution.

FIG. 3A is a diagram of an example method 40 for adjusting and categorizing the available capital of a financial institution. In step 42, a planning horizon is set, which indicates the period (e.g., number of years) covered by the capital plan. The total available capital is then determined at step 44. The available capital may, for example, be the book capital that a bank has as actual physical capital at any point in time, as determined by the bank's finance division. The available capital is then categorized at the instrument level as either Tier 1, Tier 2 or Tier 3 capital at step 46, for example by the bank's finance division, to provide the risk classifications for each instrument 48. Typically, Tier 1 capital will include equity, reserves and surplus and preference share capital, Tier 2 capital will include subordinated long term debt, hybrid debt capital instruments, and Tier 3 capital (which is for supporting Market Risks) will include short term subordinated debt.

At step 50, the available capital for each instrument is adjusted based on a number of factors. In the illustrated example, capital adjustments are made at the instrument level based on input received from each of a bank's finance, treasury and risk divisions. Specifically, the available capital is adjusted based on the projected accretion to retained earnings as determined by the finance division, the actual capital amortization and redemption schedule available with the treasury division, and the projected losses over and above the bank's loss provisions as determined by the risk division (e.g., the projected losses over the average losses each year.)

It should be understood that similar to the other processing flows described herein, one or more of the steps and the order in the flowchart may be altered, deleted, modified and/or augmented and still achieve the desired outcome.

Figure 3B:
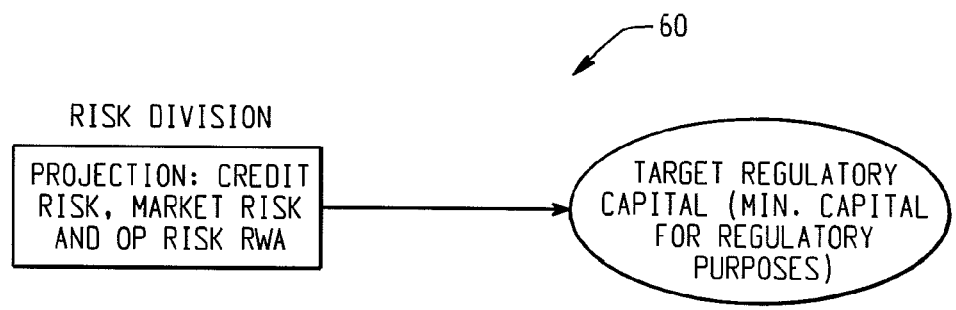
FIG. 3B is a diagram of an example method of determining a target capital value for optimizing the capital structure of a financial institution.

FIG. 3B is a diagram of an example method 60 of determining a target capital value for optimizing the capital structure of a financial institution. As shown, the target regulatory capital may be determined by the risk division of a financial institution based on the projected risk weighted assets, including the credit risk, market risk and operational risk of the financial institution. The target regulatory capital is typically set as the minimum capital that the applicable banking regulations require to be available for absorbing unexpected losses of the financial institution. For instance, the target regulatory capital may be set at a minimum 8% of the sum of a bank's projected risk weighted assets (credit risk, market risk and operational risk.)

In certain examples, one or more of the steps in FIGS. 3A and 3B may be performed using a capital management application as shown in FIG. 1 or 2. In addition, one or more of the steps in FIGS. 3A and 3B may include inputting information from the different divisions into an application interface, such as a graphical user interface, available over a computer network, such as an intranet maintained by the financial institution.

Figure 4:
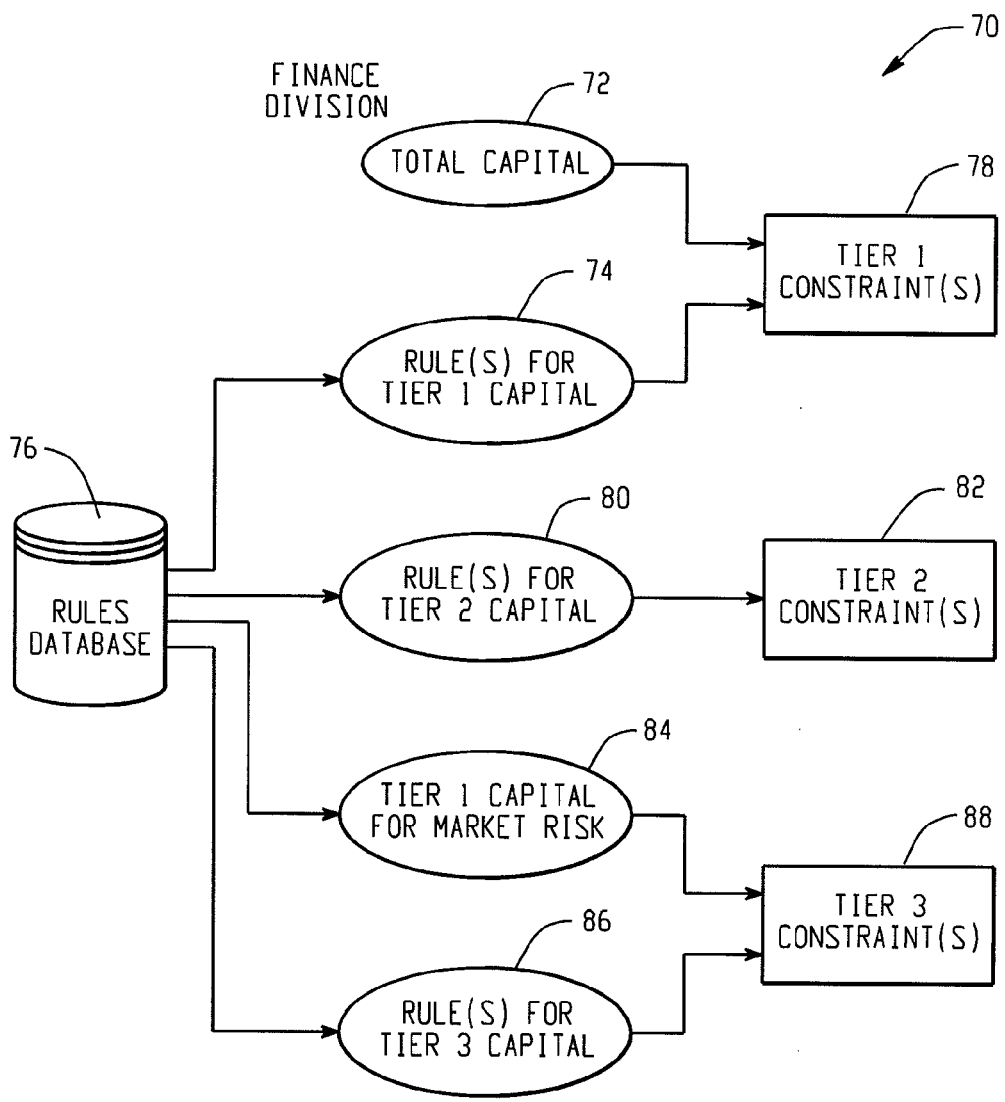
FIG. 4 is a diagram of an example method of setting risk-based constraints for optimizing the capital structure of a financial institution.

FIG. 4 is a diagram of an example method 70 of setting risk-based constraints for optimizing the capital structure of a financial institution. In step 72, the total capital 74 of the financial institution is received, for example from the financial institution's finance division (e.g., via an application interface). In step 74, one or more regulatory rules relating to Tier 1 capital are received, for example from a rules database 76. Regulatory rules may be stored in the rules database 76, for example by the finance division, based on current banking regulations. In step 74, one or more constraints on Tier 1 capital are set based on the total capital 74 of the financial institution and the one or more regulatory rules 76 on Tier 1 capital. For example, a Tier 1 constraint 78 may require that a minimum of 50% of the financial institution's total capital be in the form of Tier 1 capital.

In step 80, one or more regulatory rules relating to Tier 2 capital are received, for instance from the rules database 76. In step 82, one or more constraints on Tier 2 capital are set based on the one or more regulatory rule 80. For example, a Tier 2 constraint 82 may require that Tier 2 capital be less than Tier 1 capital.

In step 84, an indication of the Tier 1 capital required to support market risk is received, for example from the rules database 76. In step 86, one or more regulatory rules relating to Tier 3 capital are received, e.g., from the rules database 76. In step 88, one or more constraints on Tier 3 capital are set based on the Tier 1 capital required to cover market risk 84 and the one or more regulatory rule 86. For example, a Tier 3 constraint 88 may require that Tier 3 capital be less than 250% of an amount of Tier 1 required to support market risk. The Tier 1 capital required to support market risk may be set based on a regulatory value, for instance to a value of 28.5%. In this example, the Tier 3 constraint 82 may require that Tier 3 capital be less than 250% of 28.5% of the total Tier 1 capital, i.e., less than $2.5(0.285 \times T_1 Cap)$.

Figure 5:
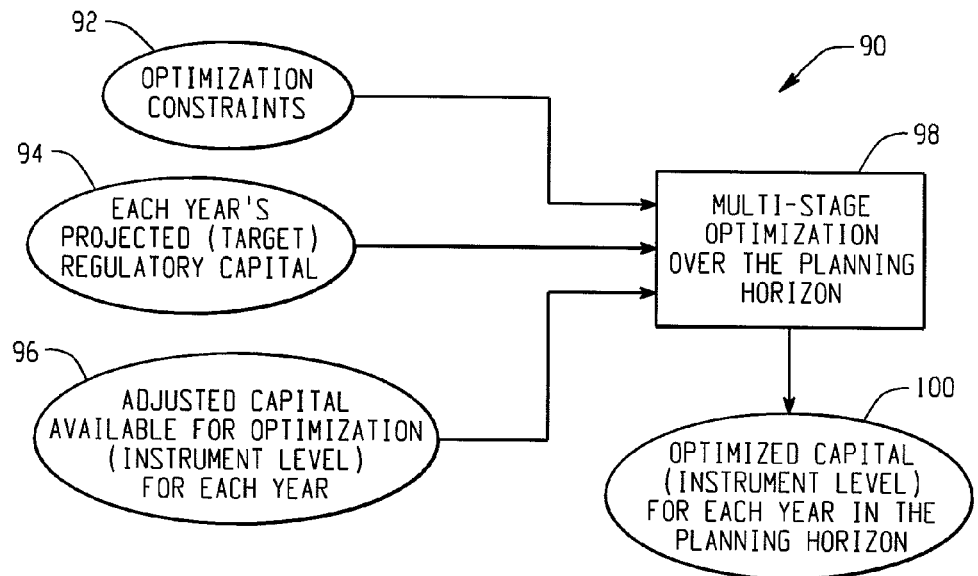
FIG. 5 is a diagram of an example method for optimizing the capital structure of a financial institution over a multi-year period.

FIG. 5 is a diagram of an example method 90 for optimizing the capital structure of a financial institution over a multi-year period. In step 92, one or more optimization constraints are received. The optimization constraints may, for example, include Tier 1, Tier 2 and Tier 3 constraints determined according to the method described above with reference to FIG. 4. In step 94, the projected (i.e., target) regulatory capital is received for each period (e.g., each year) in the planning horizon. The projected regulatory capital may, for example, be determined according to the method described above with reference to FIG. 3B. In step 96, the adjusted capital available for optimization (at the instrument level) is received for each period in the planning horizon. The adjusted available capital may, for example, be determined according to the method described above with reference to FIG. 3A, and may also include an indication of the risk classification (i.e., Tier classification) for each instrument.

In step 98, a multi-stage optimization is performed over the planning period to determine the optimized capital 100 at an instrument level for each period in the planning horizon. The optimized capital 100 for each period may be determined using an optimization algorithm, such as the algorithm described above with reference to FIG. 1, that relates, at an instrument level, the available capital 96 to the projected regulatory capital for each period in the planning horizon subject to the optimization constraints 92.

Figure 6:
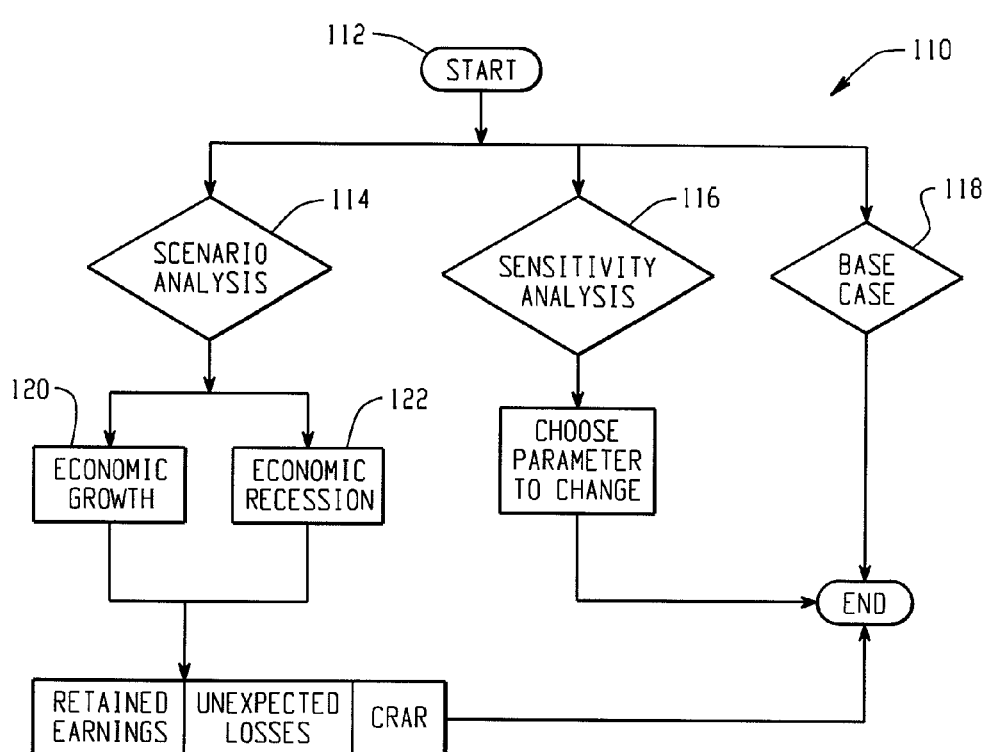
FIG. 6 is a diagram of an example method for defining parameters of a capital structure optimization process.

FIG. 6 is a diagram of an example method 110 for defining parameters of a capital structure optimization process. This method 110 may, for example, be used in connection with the capital adjustment module 34 of FIG. 2 in order to customize the parameters used by the capital adjustment module 34 to determine the adjusted available capital at an instrument level. In one example, one or more of the steps in FIG. 6 may include inputting information from the different divisions into an application interface, such as a graphical user interface, available over a computer network, such as an intranet maintained by the financial institution.

At step 112, a user input is received to select one of a scenario analysis 114, a sensitivity analysis 116 or a base case analysis 118. If a base case analysis 118 is selected, standard input parameters are used for the optimization process, and the method ends. If, however, either a scenario analysis 114 or a sensitivity analysis 116 is selected, then one or more input parameters may be changed to modify the optimization outcome. In the illustrated example, if the a scenario analysis 114 is selected, then the user is provided a choice between an economic growth model 120 or an economic recession model 122 for adjusting the available capital (at an instrument level) based on multiple factors 124, such as the projected accretion to retained earnings, the projected losses above the bank's loss provisions (unexpected losses), and the capital to risk assets ratio (CRAR). For instance, under the economic growth model 120, one or more input parameters may be adjusted to model a period of sustained economic growth (e.g., less unexpected loss), and under an economic recession model 122 one or more input parameters may be adjusted to model a period of poor economic performance (e.g., higher unexpected loss). If a sensitivity analysis 116 is selected, then the user may be provided the greater flexibility of modifying specifically selected ones of the optimization input parameters 124.

FIGS. 7-20 illustrate an example of capital structure optimization, which may be performed using the systems and method described herein. With reference first to FIG. 7, this figure illustrates an example user interface 130 for defining parameters of the capital optimization. In the illustrated example, a "base case" analysis has been selected over a four year planning horizon from 2009-2012. For each of the four years that constitute the planning horizon, values have been entered for the projected retained earnings, the projected losses above the bank's loss provisions (unexpected losses) and the projected capital to risk adequacy ratio (CRAR). In one example, these values may be entered via an application interface by different divisions of the financial institution. For example, the projected retained earnings may be input by a bank's finance division and the projected unexpected losses and CRAR may be input by the risk division.

With reference now to FIG. 8, another user interface 140 is illustrated for receiving the available capital 142 for each capital instrument 144 in the capital structure, and also for defining the Tier classification 146 for each capital instrument. Also shown on the interface 140 is the total available capital 148, which is the sum of the available capital for each instrument. As described above, the available capital 142 and Tier classifications 146 may be input by a bank's finance division.

FIGS. 9A and 9B illustrate examples of input that may be received to adjust the available capital. These inputs may, for example, be received via an application interface by different divisions of the financial institution. The first illustrated adjustment input 150 provides the projected accretion to retained earnings for each year in the planning horizon, and may, for example, be received from a bank's finance division. The second illustrated adjustment input 160 provides the projected redemption of capital instruments, and may, for example, be provided by a bank's treasury division. The third illustrated adjustment input 170 provides the projected losses above the bank's loss provisions (i.e., unexpected losses), and may, for example, be provided by a bank's risk division. The last two illustrated inputs 180 and 190 provide the current and projected risk weighted assets (RWA) and the projected regulatory capital, respectively, and may also be provided by the bank's risk division. As explained above, the projected regulatory capital 190 may be used in an optimization procedure to set the target capital value for the summation of the capital for each of the plurality of capital instruments.

Figure 10:

The inputs received in FIGS. 7-9 are used to provide the adjusted available capital and the Tier classification for each of the capital instruments, for example using the equations described above with reference to FIG. 2. FIG. 10 is an example of an application interface 200 displaying the adjusted capital at an instrument level for each year in the planning horizon. Also displayed is the total adjusted available capital for each year and the summation of the adjusted available capital for each Tier classification.

FIGS. 11 and 12 illustrate example application interfaces 210, 220 showing the capital optimization for the first year (2009) in the planning horizon. Referring first to FIG. 11, this application interface 210 is displaying the adjusted available capital for each instrument 212 along with the target capital value 214, which is set as the minimum required regulatory capital. Also illustrated in FIG. 11 is the Tier 1 capital required for market risk 216 and the constraints 218 on Tier 1, Tier 2 and Tier 3 capital, which may be determined as described above with reference to FIG. 4. Using these parameters, optimal capital values may be determined for each capital instrument by relating the adjusted available capital 212 to the overall target capital value 214 subject to constraints 216 and 218, for example using the optimization equations described above with reference to FIG. 1. The resulting optimized capital values 222 for the first year (2009) in the planning horizon are illustrated in FIG. 12. Also shown in FIG. 12 is the total optimized capital 224 and the summations 226 of the optimized capital for each Tier.

FIGS. 13-18 show the capital optimization for the remaining three years (2010-2012) in the planning horizon, using the same optimization process as described above with reference to FIGS. 11 and 12. FIG. 19 illustrates an example interface 230 showing a consolidation of the optimized values for each of the four years in the planning horizon.

FIGS. 20A and 20B show an example of a capital planning report 240 that may be generated from the example optimization process shown in FIGS. 7-19. The capital planning report 240 compares, at the instrument level, the optimized capital 242 with the adjusted available capital 244 in order to predict the capital shortfall or surplus 246 for each year in the planning horizon. The illustrated capital planning report 240 may, for example, be generated by the capital analysis modules of FIG. 1 or 2. It should be understood that, in other examples, the capital planning report 240 could be generated in other forms and including additional or different information derived from the capital optimization process. For instance, the capital shortfall/surplus and/or other information could be reported in the form of a graph or in other graphical forms.

The capital planning report 240 may, for example, be used by a financial institution to make a variety of capital planning decisions. For instance, a bank's treasury and finance divisions may use the analysis to facilitate decision making for: (a) planning the time and structure to raise capital from markets during a period of sustained capital surplus or amortize capital earlier than scheduled during a period of sustained capital shortfall; (b) determine the amount of overall capital to be raised or redeemed; (c) determine the split of a group of capital instruments between Tier 1, Tier 2 and Tier 3 and further divide the group into capital instrument class (e.g., sub-bond, mezzanine capital, hybrid capital, equity, etc.) for a granular analysis of long term capital surplus/shortfall; and/or (d) cutting dividends, cutting costs, reducing risk exposure to reduce projected capital, introducing an incremental capital charge in credit pricing, or other decisions. A bank's treasury division may, for example, use the capital planning analysis to accurately manage the investment of surplus capital (understood as an outcome of capital analysis) in capital market, with a view towards enhancing risk free return on capital. For instance, the treasury division may utilize the capital planning report 240 to bifurcate the capital surplus into Tier 1, Tier 2 and Tier 3 investments for the purpose of investment or to determine the duration of investment for bifurcated capital without creating illiquidity issues.

Figure 21:
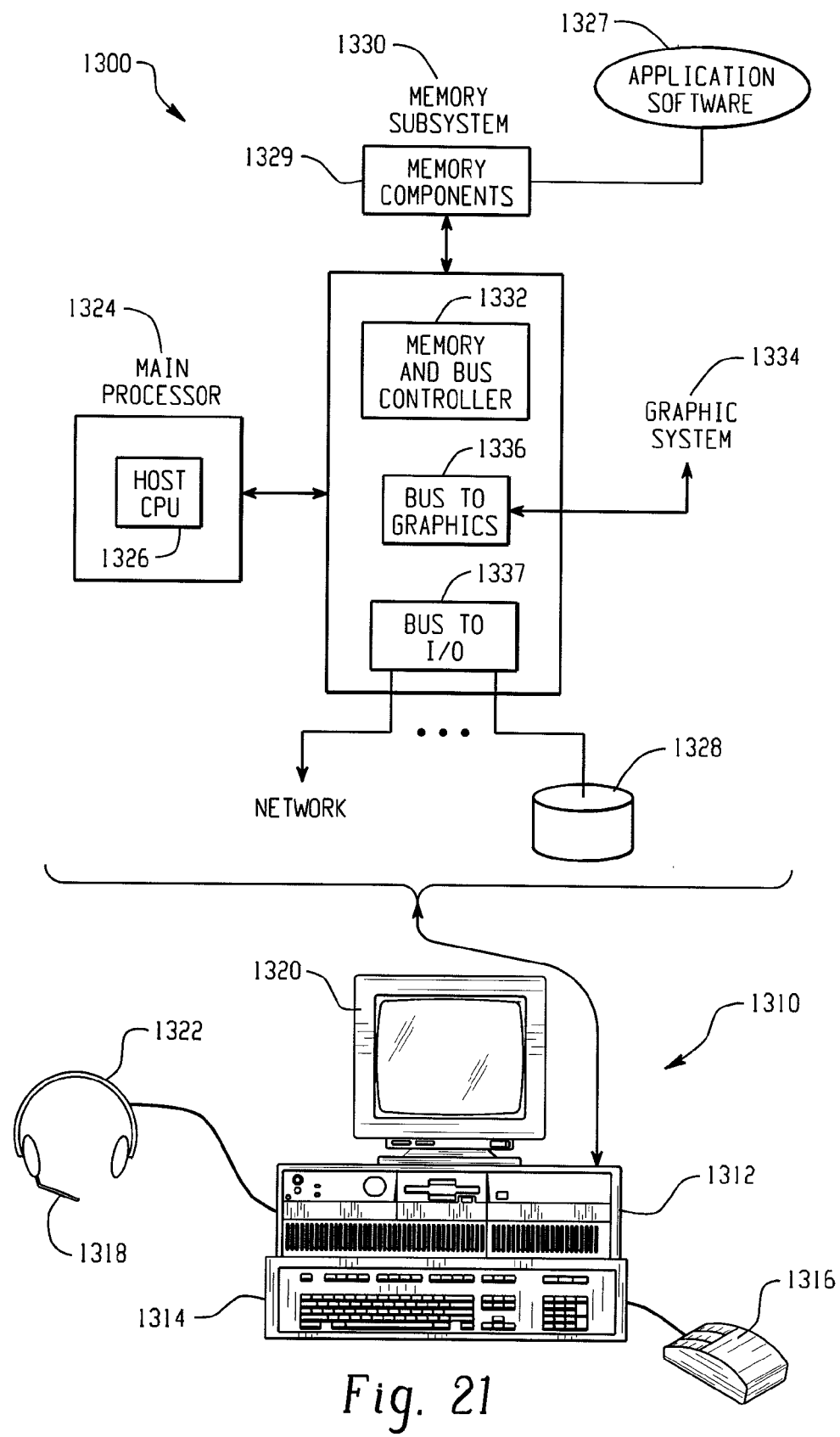
FIG. 21 illustrates example hardware on which various embodiments of the systems and methods described herein may be practiced.

FIG. 21 illustrates exemplary hardware 1310 on which various embodiments of the systems and methods described herein may be practiced. The hardware 1310 may be a personal computer system comprised of a computer 1312 having as input devices keyboard 1314, mouse 1316, and microphone 1318. Output devices such as a monitor 1320 and speakers 1322 may also be provided. The reader will recognize that other types of input and output devices may be provided and that the present invention is not limited by the particular hardware configuration.

Residing within computer 1312 is a main processor 1324 which is comprised of a host central processing unit 1326 (CPU). Software applications 1327, such as the method of the present invention, may be loaded from, for example, disk 1328 (or other device), into main memory 1329 from which the software application 1327 may be run on the host CPU 1326. The main processor 1324 operates in conjunction with a memory subsystem 1330. The memory subsystem 1330 is comprised of the main memory 1329, which may be comprised of a number of memory components, and a memory and bus controller 1332 which operates to control access to the main memory 1329. The main memory 1329 and controller 1332 may be in communication with a graphics system 1334 through a bus 1336. Other buses may exist, such as a PCI bus 1337, which interfaces to I/O devices or storage devices, such as disk 1328 or a CDROM, or to provide network access.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine-generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

This written description uses examples to disclose the invention, including the best mode, and also to enable a person skilled in the art to make and use the invention. The patentable scope of the invention may include other examples that occur to those skilled in the art.

It is further noted that the systems and methods described herein may be implemented on various types of computer architectures, such as for example on a single general purpose computer or workstation, or on a networked system, or in a client-server configuration, or in an application service provider configuration.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A computer-implemented method, comprising:
    accessing information on a computing device, wherein the information represents available capital held by a financial institution, and wherein the information specifies a distribution of available capital held with respect to multiple capital regulatory categories;
    determining, with the computing device, a forecasting timeframe divided into multiple forecasting intervals;
    accessing a forecast of retained earnings and a forecast of unexpected losses for each of the forecasting intervals;
    projecting amounts of regulatory capital required for each of the forecasting intervals, wherein, for each of the forecasting intervals, the amounts of regulatory capital include an amount of regulatory capital with respect to each of the capital regulatory categories, and wherein each-amount of regulatory capital is projected based on a capital to risk adequacy ratio, wherein projecting includes:
        accessing projected risk weighted asset data for each of the forecasting intervals; and
        projecting the amounts of regulatory capital for each of the forecasting intervals based on the projected risk weighted asset data;
    determining, with the computing device, a set of constraints for each of the forecasting intervals, wherein each set of constraints includes a constraint with respect to each of the capital regulatory categories, and wherein each constraint is determined using the projected amount of regulatory capital for the respective forecasting interval;
    for each of the forecasting intervals, calculating an adjusted available capital with respect to each of the capital regulatory categories, wherein, for each of the forecasting intervals,
    the adjusted available capital is calculated based on the forecast of retained earnings and unexpected losses for that interval; and
    for each of the forecasting intervals, calculating optimized amounts of capital with respect to each of the capital regulatory categories, wherein, calculating the optimized amounts of capital for each of the forecasting intervals is based on the projected amounts of regulatory capital for each of the forecasting intervals, the adjusted available capital for each of the forecasting intervals, and the set of constraints for each of the forecasting intervals.

2. The method of claim 1, wherein the capital regulatory categories include Tier 1, Tier 2 and Tier 3 capital classifications as defined by a publication of a second Basel Accord (Basel II) by a Basel Committee on Banking Supervision.

3. The method of claim 1, wherein, for each of the forecasting intervals, the respective constraints include a required minimum amount of capital classified within a Tier 1 capital classification.

4. The method of claim 3, wherein, for each of the forecasting intervals, the respective constraints include a maximum amount of capital classified within a Tier 2 capital classification, and a maximum amount of capital classified within a Tier 3 capital classification.

5. The method of claim 4, wherein the maximum amount of capital classified within the Tier 2 capital classification is specified with respect to the amount of capital classified within the Tier 1 capital classification.

6. The method of claim 1, further comprising:
    publishing a report based on the calculated adjustments to available capital.

7. The method of claim 1, further comprising:
    using the optimized amounts of capital to inform financial decision-making related to a capital structure of the financial institution.

8. The method of claim 1, wherein the available capital is associated with multiple instruments, wherein a first one of the instruments is a Tier 1 instrument, and a second one of the instruments is a Tier 2 instrument.

9. The method of claim 8, wherein the adjustments to each adjusted available capital are is calculated with respect to the Tier 1 instrument and the Tier 2 instrument.

10. The method of claim 1, wherein at least one of the constraints is based on total available capital of the financial institution.

11. The method of claim 1, wherein at least one of the constraints is based on one or more regulatory rules.

12. The method of claim 11, wherein the one or more regulatory rules are received from a rules database.

13. The method of claim 1, wherein the forecasting intervals include an initial forecasting interval and at least one subsequent forecasting interval, and wherein, with respect to the initial forecasting interval:
    calculating adjusted available capital in each of the capital regulatory categories includes adjusting the available capital held with respect to each of the multiple capital regulatory categories, wherein the available capital held is adjusted based on the forecast of retained earnings and the forecast of unexpected losses for the initial forecasting interval.

14. The method of claim 1, wherein each of the subsequent forecasting intervals is preceded by one or more of the forecasting intervals, and wherein, with respect to each of the subsequent forecasting intervals, calculating the adjusted available capital with respect to each of the capital regulatory categories is further based on the forecast of unexpected losses and the forecast of retained earnings for each of the preceding forecasting intervals.

15. The method of claim 1, further comprising:
ascertaining a scheduled amortization of capital for each of the forecasting intervals, wherein calculating the optimized amounts of capital for each of the forecasting intervals is further based on the respective scheduled amortization of capital.

16. A system, comprising:
one or more processors;
one or more non-transitory computer-readable storage mediums containing instructions configured to cause the one or more processors to perform operations including:
accessing information on a computing device, wherein the information represents available capital held by a financial institution, and wherein the information specifies a distribution of available capital held with respect to multiple capital regulatory categories;
determining, with the computing device, a forecasting timeframe divided into multiple forecasting intervals;
accessing a forecast of retained earnings and a forecast of unexpected losses for each of the forecasting intervals;
projecting amounts of regulatory capital required for each of the forecasting intervals, wherein, for each of the forecasting intervals, the amounts of regulatory capital include an amount of regulatory capital with respect to each of the capital regulatory categories, and wherein each-amount of regulatory capital is projected based on a capital to risk adequacy ratio, wherein projecting includes:
accessing projected risk weighted asset data for each of the forecasting intervals; and
projecting the amounts of regulatory capital for each of the forecasting intervals based on the projected risk weighted asset data;
determining, with the computing device, a set of constraints for each of the forecasting intervals, wherein each set of constraints includes a constraint with respect to each of the capital regulatory categories, and wherein each constraint is determined using the projected amount of regulatory capital for the respective forecasting interval;
for each of the forecasting intervals, calculating an adjusted available capital with respect to each of the capital regulatory categories, wherein, for each of the forecasting intervals, the adjusted available capital is calculated based on the forecast of retained earnings and unexpected losses for that interval; and
for each of the forecasting intervals, calculating optimized amounts of capital with respect to each of the capital regulatory categories, wherein, calculating the optimized amounts of capital for each of the forecasting intervals is based on the projected amounts of regulatory capital for each of the forecasting intervals, the adjusted available capital for each of the forecasting intervals, and the set of constraints for each of the forecasting intervals.

17. The system of claim 16, wherein the capital regulatory categories include Tier 1, Tier 2 and Tier 3 capital classifications as defined by a publication of a second Basel Accord (Basel II) by a Basel Committee on Banking Supervision.

18. The system of claim 16, wherein, for each of the forecasting intervals, the respective constraints include a required minimum amount of capital classified within a Tier 1 capital classification.

19. The system of claim 18, wherein, for each of the forecasting intervals, the respective constraints include a maximum amount of capital classified within a Tier 2 capital classification, and a maximum amount of capital classified within a Tier 3 capital classification.

20. The system of claim 19, wherein the maximum amount of capital classified within the Tier 2 capital classification is specified with respect to the amount of capital classified within the Tier 1 capital classification.

21. The system of claim 16, wherein the operations further include:
publishing a report based on the calculated adjustments to available capital.

22. The system of claim 16, wherein the operations further include:
using the optimized amounts of capital to inform financial decision-making related to a capital structure of the financial institution.

23. The system of claim 16, wherein the available capital is associated with multiple instruments, wherein a first one of the instruments is a Tier 1 instrument, and a second one of the instruments is a Tier 2 instrument.

24. The system of claim 23, wherein each adjusted available capital is calculated with respect to the Tier 1 instrument and the Tier 2 instrument.

25. The system of claim 16, wherein at least one of the constraints is based on total available capital of the financial institution.

26. The system of claim 16, wherein at least one of the constraints is based on one or more regulatory rules.

27. The system of claim 26, wherein the one or more regulatory rules are received from a rules database.

28. The system of claim 16, wherein the forecasting intervals include an initial forecasting interval and at least one subsequent forecasting interval, and wherein, with respect to the initial forecasting interval:
calculating adjusted available capital in each of the capital regulatory categories includes adjusting the available capital held with respect to each of the multiple capital regulatory categories, wherein the available capital held is adjusted based on the forecast of retained earnings and the forecast of unexpected losses for the initial forecasting interval.

29. The system of claim 16, wherein each of the subsequent forecasting intervals is preceded by one or more of the forecasting intervals, and wherein, with respect to each of the subsequent forecasting intervals, calculating the adjusted available capital with respect to each of the capital regulatory categories is further based on the forecast of unexpected losses and the forecast of retained earnings for each of the preceding forecasting intervals.

30. The system of claim 16, wherein the operations further include:
ascertaining a scheduled amortization of capital for each of the forecasting intervals, wherein calculating the optimized amounts of capital for each of the forecasting intervals is further based on the respective scheduled amortization of capital.

31. A computer-program product, tangibly embodied in a machine-readable non-transitory storage medium, including instructions configured to cause a data processing apparatus to perform operations comprising:

accessing information on a computing device, wherein the information represents available capital held by a financial institution, and wherein the information specifies a distribution of available capital held with respect to multiple capital regulatory categories;

determining, with the computing device, a forecasting timeframe divided into multiple forecasting intervals;

accessing a forecast of retained earnings and a forecast of unexpected losses for each of the forecasting intervals;

projecting amounts of regulatory capital required for each of the forecasting intervals, wherein, for each of the forecasting intervals, the amounts of regulatory capital include an amount of regulatory capital with respect to each of the capital regulatory categories, and wherein each-amount of regulatory capital is projected based on a capital to risk adequacy ratio, wherein projecting includes:

accessing projected risk weighted asset data for each of the forecasting intervals; and projecting the amounts of regulatory capital for each of the forecasting intervals based on the projected risk weighted asset data;

determining, with the computing device, a set of constraints for each of the forecasting intervals, wherein each set of constraints includes a constraint with respect to each of the capital regulatory categories, and wherein each constraint is determined using the projected amount of regulatory capital for the respective forecasting interval;

for each of the forecasting intervals, calculating an adjusted available capital with respect to each of the capital regulatory categories, wherein, for each of the forecasting intervals, the adjusted available capital is calculated based on the forecast of retained earnings and unexpected losses for that interval; and for each of the forecasting intervals, calculating optimized amounts of capital with respect to each of the capital regulatory categories, wherein, calculating the optimized amounts of capital for each of the forecasting intervals is based on the projected amounts of regulatory capital for each of the forecasting intervals, the adjusted available capital for each of the forecasting intervals, and the set of constraints for each of the forecasting intervals.

32. The computer-program product of claim 31, wherein the capital regulatory categories include Tier 1, Tier 2 and Tier 3 capital classifications as defined by a publication of a second Basel Accord (Basel II) by a Basel Committee on Banking Supervision.

33. The computer-program product of claim 31, wherein, for each of the forecasting intervals, the respective constraints include a required minimum amount of capital classified within a Tier 1 capital classification.

34. The computer-program product of claim 33, wherein, for each of the forecasting intervals, the respective constraints include a maximum amount of capital classified within a Tier 2 capital classification, and a maximum amount of capital classified within a Tier 3 capital classification.

35. The computer-program product of claim 34, wherein the maximum amount of capital classified within the Tier 2 capital classification is specified with respect to the amount of capital classified within the Tier 1 capital classification.

36. The computer-program product of claim 31, wherein the operations further comprise:
   publishing a report based on the calculated adjustments to available capital.

37. The computer-program product of claim 31, wherein the operations further comprise:
   using the optimized amounts of capital to inform financial decision-making related to a capital structure of the financial institution.

38. The computer-program product of claim 31, wherein the available capital is associated with multiple instruments, wherein a first one of the instruments is a Tier 1 instrument, and a second one of the instruments is a Tier 2 instrument.

39. The computer-program product of claim 38, wherein each adjusted available capital is calculated with respect to the Tier 1 instrument and the Tier 2 instrument.

40. The computer-program product of claim 31, wherein at least one of the constraints is based on total available capital of the financial institution.

41. The computer-program product of claim 31, wherein at least one of the constraints is based on one or more regulatory rules.

42. The computer-program product of claim 41, wherein the one or more regulatory rules are received from a rules database.

43. The computer-program product of claim 31, wherein the forecasting intervals include an initial forecasting interval and at least one subsequent forecasting interval, and wherein, with respect to the initial forecasting interval:
   calculating adjusted available capital in each of the capital regulatory categories includes adjusting the available capital held with respect to each of the multiple capital regulatory categories, wherein the available capital held is adjusted based on the forecast of retained earnings and the forecast of unexpected losses for the initial forecasting interval.

44. The computer-program product of claim 31, wherein each of the subsequent forecasting intervals is preceded by one or more of the forecasting intervals, and wherein, with respect to each of the subsequent forecasting intervals, calculating the adjusted available capital with respect to each of the capital regulatory categories is further based on the forecast of unexpected losses and the forecast of retained earnings for each of the preceding forecasting intervals.

45. The computer-program product of claim 31, wherein the operations further include:
   ascertaining a scheduled amortization of capital for each of the forecasting intervals, wherein calculating the optimized amounts of capital for each of the forecasting intervals is further based on the respective scheduled amortization of capital.

* * * * *